Patented Sept. 11, 1934

1,973,050

UNITED STATES PATENT OFFICE 1,973,050

MANUFACTURE OF RESINOUS CONDENSATION PRODUCTS OF ALDEHYDES WITH PHENOL AND UREA

John Willies Crump, Westminster, London, England, assignor to Bakelite Limited, London, England, a British corporation No Drawing. Application November 15, 1928, Serial No. 319,744. In Great Britain January 16, 1928

10 Claims. (Cl. 260—4)

This invention relates to the manufacture of the resinous products of condensation of phenol and urea or urea alone, or suitable derivatives or homologues of these bodies, with an aldehyde, and has for its object to provide an improved process of manufacture of the type comprising essentially (a) bringing together the urea, or the phenol and urea, and the aldehyde (in aqueous solution) and effecting an initial condensation as between them, and (b) eliminating the water and any unreacted raw material from the initial condensation product and subjecting the latter to heat-treatment, or heat- and pressure-treatment, to transform it from a soluble and fusible condition into or towards the insoluble and infusible state. The latter part of the process results, according in the main to the duration of the heat-treatment, in the formation of either an ultimate product which is heat-, acid- and alkali-resisting, or an intermediate product which softens under application of heat and tends to swell on contact with certain organic solvents. There are thus three stages of transformation—an initial stage in which the condensation product is both soluble and fusible, an intermediate stage, and lastly a final stage. The stage to which the transformation is taken depends upon the use to which the product is to be put. If the product is to be used as the material of moulded articles or is to be a substitute for glass and the like, transformation is usually carried to the final stage. If, on the other hand, the condensation product is for use in the manufacture of lacquers and the like, the initial soluble and fusible condensation product is so treated as to approach the insoluble and infusible condition as nearly as possible without actually reaching it. The material is then dissolved in a suitable solvent to form the lacquer. In the case of moulded articles, the initial condensation product may be heated in an open pan until the final stage is reached and thereupon introduced into a mould to set therein, or the initial product may be heated in an open pan for a part only of the period of complete transformation and then be introduced into a mould to set and assume the final stage of transformation therein either simply under the application of further heat or under the combined action of both further heat and also pressure.

A number of difficulties attend the production, as aforesaid, of these condensation products, among which, in the case of the production of the transparent glass-like variety of products, is the tendency of the finished material to be cloudy and more or less discolored. I have found that this difficulty and others well known in the art can be overcome and, in the case of moulded and like products, a clear water-white product can be obtained, if in effecting part (b) of the process, the initial condensation product be subjected first to distillation in vacuo to free it as completely as possible of water and unreacted raw materials, preferably in the presence of a dehydrating agent such, for example, as butyl alcohol, and then to open pan heating under substantially atmospheric pressure until the desired stage of transformation (complete or only partial as the case may be) has been reached.

The improvement seems to be specially marked in the case of phenol-urea-aldehyde products, that is to say, in the case of the resinous products of condensation of both phenol and urea with aldehyde, the phenol as well as the urea, having been employed in substantial proportions in the reaction mixture.

I have also found that the improvement, in the case of phenol-urea-aldehyde condensation products, is considerably enhanced if in effecting part (a) of the process, the phenol, the urea and the aldehyde solution components of the reaction mixture be brought together in a sequence of operations which comprises adding, gradually and preferably in instalments, to a hot (preferably boiling) solution of the phenol component in a part (preferably an equal part by weight) of the aldehyde solution component, a solution of the urea component in the remainder of the aldehyde solution component.

If desired, the reaction may be accelerated by the use of a condensing agent which may either be alkaline, acidic, or a salt. I have found it preferable, however, when using an accelerator, to add the agent either towards the close of the operation of bringing the reacting materials together, or after it. I have also found that for better results it is sometimes advisable to add first an alkaline accelerator, either towards the close of the operation of mixing the raw materials or immediately following it, and then, later on in the process, for example, during the distillation in vacuo step, to add an accelerator of acid reaction.

The dehydrating agent is preferably of the butyl alcohol type and should be one which will form a constant boiling mixture with water. If acid anhydrides are used, either of the organic type, such as acetic anhydride, or of the inorganic class, such as oxide of phosphorus, the presence of the resultant acids tends undesirably to accelerate the action in the process and hardening sets in too rapidly. Also dehydrating agents of the type of anhydrous calcium chloride have been found in general to be undesirable for the purposes of this invention.

The invention is applicable both to phenol-urea-formaldehyde products and also to plain urea-formaldehyde resins. Both classes of resins are members of that group of condensation products known as amino-plastics in contrast, of course, to the phenol-formaldehyde type of resin which is not a member of this group.

Several examples of the invention will now be given by way of illustration:

The first of these examples is an illustration of the invention as applied to the manufacture of plain urea-formaldehyde resin.

100 parts by weight of 40% formaldehyde with 5 parts by weight of ammonia, were brought to the boil. 60 parts by weight of the urea dissolved in 65 parts by weight of 40% formaldehyde were then gradually added in instalments cold to the boiling solution of formaldehyde. The reaction mixture was then submitted to boiling under a reflux condenser for about 10 minutes.

The resulting syrup was subjected to vacuum distillation until the bulk of the water was removed. Butyl alcohol (15 to 20 parts by weight) was then added and the vacuum distillation continued. When the syrup had attained a fair consistency it was transferred to an open pan and the boiling was continued to the furtherest point of viscosity while retaining solubility. The still-soluble viscous syrup was then dissolved in an appropriate solvent so as to form a lacquer. The lacquer gave an extremely beautiful film.

A second example will now be described, which illustrates the invention as applied to phenol-urea-formaldehyde resins.

A mixture composed of 100 parts by weight of phenol and 100 of 40% formaldehyde solution was first brought to the boil. A cold solution consisting of 80 parts by weight of urea dissolved in 225 parts of 40% formaldehyde solution was then added gradually and in instalments to the boiling phenol solution. Heating was continued during the operation under a reflux condenser until the last of the urea solution had been added. The mixture was then subjected to vacuum distillation until the bulk of the water was removed. 50 parts by weight of butyl alcohol were then added and vacuum distillation continued until, as before, the syrup had attained a fair consistency, when it was transferred to an open pan and boiled therein, as in the first example. The resulting viscous but still-soluble syrup was then dissolved in a suitable solvent to form a lacquer.

The following is another example of the invention as applied to phenol-urea-formaldehyde resins, the relative proportions of the reacting ingredients being somewhat different from those in the previous example.

100 parts by weight of phenol were dissolved in 100 of 40% formaldehyde solution, and the mixture was brought to the boil. To the boiling solution of phenol was added, carefully and gradually, a cold solution composed of 40 parts by weight of urea dissolved in 100 parts of 40% formaldehyde. As in the previous example, heating was continued during this operation under a reflux condenser until the last of the urea solution had been added, the mixture was subjected to vacuum distillation to remove the bulk of the water, butyl alcohol was added, the vacuum distillation continued until the syrup had attained a fair consistency, and finally, when this point had been reached, the syrup was transferred to an open pan and boiled therein to carry the reaction to the desired stage of completion.

The reaction in this example could have been accelerated by the addition, at or towards the close of the operation of mixing the raw materials together, of 5 parts by weight of hexamethylentetramine, and then, immediately before the step of vacuum distillation, of a small proportion of oxalic acid.

If the resin is not for the purpose of making a lacquer, e. g., if it is to be used in moulding powders or the like, the open-pan heating may, in each of the above examples, be continued beyond the soluble stage of transformation to the insoluble final stage.

Generally speaking, the ratio of phenol to urea in the reaction mixture may vary from approximately ½:1 to 5:1 according to the use to which the resin is to be put. It should be pointed out, however, that the higher proportions of phenol to urea tend to enhance water-resistant properties of the resulting resin and that generally speaking the water-whiteness of color of the resins is most marked when the phenol-urea ratio is in the lower part of the aforesaid range.

I claim:

1. Process of preparing a resinous condensation product of the phenol-urea-aldehyde type which comprises effecting an initial condensation between a phenol, a urea and an aqueous aldehyde in a sequence that comprises adding gradually to a hot solution of the phenol component in a portion of the aldehyde a solution of the urea component in the remainder of the aldehyde, eliminating water by subjecting the initial condensation product to distillation in vacuo to free it as completely as possible from water and unreacted raw materials, and then heating under substantially atmospheric pressure to transform the product to a stage short of the infusible and insoluble stage.

2. Process according to claim 1 wherein the distillation in vacuo is carried out in the presence of a dehydrating agent forming a constant boiling mixture with water.

3. Process according to claim 1 wherein an alkaline condensing agent is employed in the initial condensation step and an acidic condensing agent is present in the distillation.

4. Process according to claim 1 wherein ammonia is present as a condensing agent in the initial condensation and oxalic acid as a condensing agent is present in the distillation.

5. Process of preparing a resinous condensation product of the urea-aldehyde type which comprises effecting an initial condensation between a urea and an aqueous aldehyde in a sequence that comprises gradually adding to a heated portion of the aqueous aldehyde a solution of the urea in the remainder of the aldehyde, eliminating water by subjecting the initial condensation product to distillation in vacuo to free it as completely as possible from water and unreacted raw materials, and then heating under substantially atmospheric pressure to transform the product to a stage short of the infusible and insoluble stage.

6. Process according to claim 5 wherein the distillation in vacuo is carried out in the presence of a dehydrating agent forming a constant boiling mixture with water.

7. Condensation product obtained by the process of claim 1.

8. Condensation product obtained by the process of claim 2.

9. Condensation product obtained by the process of claim 3.

10. Condensation product obtained by the process of claim 4.

JOHN WILLIES CRUMP.